United States Patent [19]

Sorensen

[11] Patent Number: 4,906,312

[45] Date of Patent: Mar. 6, 1990

[54] METHOD FOR ASSEMBLING A GLAZING PANEL

[75] Inventor: Henning V. Sorensen, Vedbaek, Denmark

[73] Assignee: V. Kann Rasmussen Industri A/S, Soborg, Denmark

[21] Appl. No.: 184,101

[22] Filed: Apr. 20, 1988

[30] Foreign Application Priority Data

Apr. 28, 1987 [DK] Denmark .............................. 2154/87

[51] Int. Cl.[4] .......................... C03C 27/04; C09J 3/30; E06B 3/24

[52] U.S. Cl. ....................................... 156/109; 29/450; 29/451; 156/160; 264/241; 428/34; 52/171

[58] Field of Search .................. 29/450, 451; 156/109, 156/160; 428/34; 52/171; 264/241

[56] References Cited

U.S. PATENT DOCUMENTS 1,891,932 12/1932 Hunter .................................. 29/450
2,030,874 2/1936 Hunter .................................. 29/450

FOREIGN PATENT DOCUMENTS 2310069 11/1976 France .
2450338 9/1980 France .
394487 6/1977 Sweden .
434668 10/1967 Switzerland .

*Primary Examiner*—Jan H. Silbaugh
*Assistant Examiner*—Mathieu Vargot
*Attorney, Agent, or Firm*—Lane & Aitken

[57] ABSTRACT

The glazing panel assembled by the method according to the invention includes a frame with webs, supporting blocks and stay blocks, a pane, and sealing strips between the pane and the webs of the frame. According to the method the frame is assembled on the pane using one elastic sealing strip, whereupon the pane is forced against one of the webs, whereby the elastic sealing strip is compressed and the other sealing strip may be fitted freely in place. The force pressing the pane towards the first web is then released, whereby the first sealing strip by transverse expansion forces the pane towards the second web and against the second sealing strip to secure the pane in the frame.

4 Claims, 1 Drawing Sheet

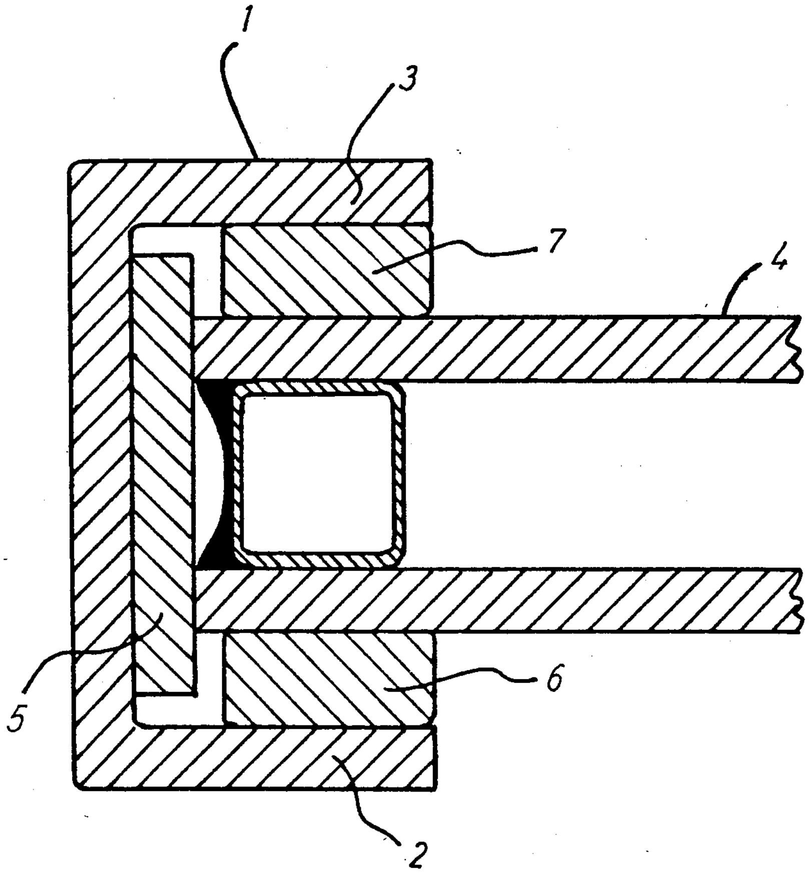
1
3
7
4
5
6
2

METHOD FOR ASSEMBLING A GLAZING PANEL

FIELD OF THE INVENTION

This invention relates to a method for assembling a glazing panel comprising a pane and a surrounding frame consisting of frame elements, preferably of metal and having a U-shaped cross section and where a sealing strip is inserted between the pane and each of the U-webs of the frame elements.

BACKGROUND OF THE INVENTION

In a known method of the type described above, a sealing strip, having a width larger than the thickness of the pane, is fitted along one edge of the pane. The corresponding frame element is then pushed over the edge of the pane and carries the strip along so that it fits snugly on each side of the pane, forming a seal between each of the two webs and the pane. The remaining frame elements are pushed on to the pane in the same way, and the corner forming ends of the frame elements are interconnected to form a closed frame.

The width of the strip is generally such that the edges of the strip, after the frame element has been fitted, lie flush with those edges of the U-webs of the frame elements facing the centre of the pane. The strip may be made from an elastomeric material, or may consist of a paper tape coated with a highly viscous material such as bitumen. In the last mentioned case the supporting paper tape is removed, when the sealing material has been placed on the edge of the pane.

This method has the drawback that it is difficult to guide the sealing strip to lie flush with the edges of the U-webs in the finished frame, and it may be necessary after assembly of the frame, to cut off material which has been carried onto the pane, especially when using a bituminous sealing strip.

SUMMARY OF THE INVENTION

The method according to the invention differs from prior art methods in that the pane, after the frame has been assembled around it with the sealing strip positioned in an unloaded condition between the pane and one of the frame webs, is forced towards said web to compress said sealing strip, and another sealing strip is then inserted between the pane and the other frame web, whereupon the force is released, whereby the first sealing strip by transverse expansion presses the pane towards the last mentioned frame web and against the other sealing strip.

In this way the sealing strips on each side of the pane can be fitted in place, without at the same time being exposed to strong forces. This allows an easy and precise placement of the sealing strips in relation to the edges of the webs on the frame elements and has the advantage that a possible subsequent trimming of the edges of the sealing strips can be omitted.

According to the invention the second sealing strip may comprise a highly viscous, adhesive material, or it may as the first sealing strip be transversly elastic.

DESCRIPTION OF THE DRAWING

The invention will now be explained in more details and with reference to the drawing which shows a cross section of a glazing panel assembled by the method according to the invention.

DETAILED DESCRIPTION OF THE PREFERRED EMBODIMENT

The glazing panel shown in the drawing comprises a pane, here an insulating glass (double glazed) pane 4, and frame elements 1 having a U-shaped cross section with a first web 2 and a second web 3. Between the web 2 and the pane 4 there is a first elastic sealing strip 6. A second sealing strip 7 is inserted between the pane and the second frame web 3. Conventional supporting blocks and stay blocks 5 are provided at the bottom of the U-shape of the frame elements 1.

When the frame elements, including the supporting blocks and the stay blocks 5 have been fitted on the pane 4, and the first sealing strip 6 is placed in its final position, the pane 4 and the web 2 are forced against each other, whereby the elastic sealing strip 6 is compressed in a transverse direction. The second sealing strip 7 is then inserted between the pane and the second web 3, and the force pressing the pane 4 and the web 2 against each other is released, whereupon the sealing strip 6 by transverse expansion forces the pane 4 towards the second web 3 and against the sealing strip 7.

If the second sealing strip 7 is made from a highly viscous, adhesive material, such as bitumen, pane 4 is secured in the frame not only by the expansion force of the first sealing strip 6, but also by the adhesion between the sealing strip 7, pane 4 and frame web 3, respectively. In order to prevent that plastic flow of the viscous material in the sealing strip 7 reduces the thickness of the strip 7 to such an extent that the expansion force of the first sealing strip 6 is insufficient to retain the pane, the second sealing strip 7 may have a core of rubber for example, thereby insuring a minimum thickness of the strip.

In another embodiment of the method, the second sealing strip 7 is also elastic in the transverse direction. By compressing the first sealing strip, the second sealing strip 7 may be fitted in place in a frame element in its free, expanded condition. This eases the work of fitting the strip and the strip may be placed precisely flush with the free edge of the web 3. When the load on web 2 is released, pane 4 is secured by the combined expansion forces of the elastic sealing strips 6 and 7.

What is claimed is:

1. A method for assembling a glazing panel including a pane having opposite sides, a surrounding frame made of frame elements having a U-shaped cross section and webs defined by sides of the U-shape, and a sealing strip between the pane and each of the webs of the frame elements, comprising:
   - assembling the frame around the pane such that a first of the sealing strips, which is elastic, is positioned in an unloaded condition between the pane and one of the frame webs, and both frame webs overlap the sides of the pane;
   - forcing the pane towards said one of the webs to compress said first sealing strip and thereby form between the pane and the other of said webs a space large enough to permit the other of said sealing strips to be inserted in its free, undistorted condition in the space;
   - inserting the other of said sealing strips in its free, undistorted condition in the space between the pane and said other web; and
   - releasing the force against the pane, whereby said first sealing strip by transverse expansion presses the pane against said other web and against said other sealing strip.

2. The method according to claim 1, wherein the other sealing strip comprises a highly viscous, adhesive material.

3. The method according to claim 1, wherein the other sealing strip also is transversely elastic.

4. The method according to claim 1, wherein the frame elements are made of metal.

* * * * *